US012760659B2

(12) United States Patent
Moffett

(10) Patent No.: US 12,760,659 B2
(45) Date of Patent: Oct. 13, 2026

(54) RESTRAINING PLUG

(71) Applicant: RTX Corporation, Farmington, CT (US)

(72) Inventor: Utah Moffett, Middletown, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/296,326

(22) Filed: Aug. 11, 2025

(65) Prior Publication Data

US 2025/0369369 A1 Dec. 4, 2025

Related U.S. Application Data

(62) Division of application No. 17/558,019, filed on Dec. 21, 2021, now Pat. No. 12,385,411.

(51) Int. Cl.

*F01D 21/00* (2006.01)
*B64D 29/08* (2006.01)
*F01D 25/00* (2006.01)

(52) U.S. Cl.

CPC ........... *F01D 21/003* (2013.01); *B64D 29/08* (2013.01); *F01D 25/00* (2013.01); *F05D 2220/32* (2013.01)

(58) Field of Classification Search

CPC ........ F01D 25/24; F01D 25/00; F01D 21/003; B64D 29/08; F05D 2220/32
See application file for complete search history.

(56) References Cited

U.S. PATENT DOCUMENTS

| | | | | |
|---|---|---|---|---|
| 4,815,276 | A | 3/1989 | Hansel et al. | |
| 5,115,636 | A | 5/1992 | Zeiser | |
| 5,431,534 | A * | 7/1995 | Charbonnel | F01D 21/003 415/138 |
| 5,867,976 | A | 2/1999 | Ziegler, Jr. | |
| 9,157,638 | B2 | 10/2015 | Ponziani et al. | |
| 11,242,804 | B2 | 2/2022 | Gonyou et al. | |
| 2009/0202340 | A1 * | 8/2009 | Ballard, Jr. | F01D 25/00 415/118 |
| 2015/0125267 | A1 | 5/2015 | Hatcher, Jr. et al. | |

(Continued)

OTHER PUBLICATIONS

Extended European Search Report for EP Application No. 22215205.0; Issue date, May 19, 2023, 35 pages.

(Continued)

*Primary Examiner* — Andrew H Nguyen
(74) *Attorney, Agent, or Firm* — CANTOR COLBURN LLP

(57) ABSTRACT

A plug assembly for plugging one or more ports of a gas turbine engine, the plug assembly including: a sheath including: an inner end; an outer end located opposite the inner end; and a sheath through-passage extending from the outer end to the inner end; a connector body passing through the sheath through-passage, the connector body comprising a rotatable joint; a cover operably connected to the connector body via the rotatable joint; a biasing mechanism configured to apply a force to the connector body; and a top housing comprising a bottom end and a connector passageway extending from the bottom end a top end of the top housing, wherein the biasing mechanism abuts the bottom end or is located in the cavity at the bottom end, and wherein the connector body passes through the connector passageway.

10 Claims, 8 Drawing Sheets

(56) References Cited

U.S. PATENT DOCUMENTS

| | | | | |
|---|---|---|---|---|
| 2017/0107859 | A1* | 4/2017 | Clark | F01D 25/002 |
| 2018/0363561 | A1* | 12/2018 | Gonyou | F02C 7/28 |
| 2023/0193780 | A1 | 6/2023 | Moffett | |

OTHER PUBLICATIONS

U.S. Non-Final Office Action corresponding to U.S. Appl. No. 17/558,019; Issue date, Feb. 27, 2024, 19 pages.

Extended European Search Report for EP Application No. 26154382.1; Issue date, Jun. 17, 2026, 8 pages.

* cited by examiner

500

512 Securing the top housing together with the sheath

RESTRAINING PLUG

CROSS REFERENCE TO RELATED APPLICATIONS

This application is a divisional of U.S. patent application Ser. No. 17/558,019 filed on Dec. 21, 2021, the contents of which are incorporated herein by reference thereto.

BACKGROUND

The subject matter disclosed herein relates generally to gas turbine engines and, more particularly, to a plug for plugging an inspection port in a gas turbine engine.

Gas turbine engines typically operate at high rotational speeds and high temperatures for increased performance and efficiency. In many cases, performance of an engine may be tied to proper operation and function of engine components. During operation, components may be damaged, fail or otherwise require maintenance. In addition, control of an engine may be based on the operation of components within an engine. Safety inspections and routine maintenance are often required to ensure safe operation and prevent engine failure. Many gas turbine engines include inspection ports to allow for inspection and/or maintenance of an engine. Conventional methods of sealing these ports can be expensive and in some cases, may lead to foreign object damage (FOD) due to improper installation during manufacture or maintenance. Moreover, some gas turbine engines may have dozens of ports. In addition, correct operation and installation of port components may be required for safe and efficient operation of an engine. There is a need in the art for port components for gas turbine engines.

BRIEF DESCRIPTION

According to one embodiment, a method for assembling a plug assembly for plugging one or more ports of a gas turbine engine is provided. The method includes that a connector body and a cover operably connected to the connector body are inserted into a sheath through-passage of a sheath. The connector body including a rotatable joint operably connecting the cover to the connector body. The method also includes that a biasing mechanism configured to apply a force to the cover is installed, the cover is rotated relative to the connector body via the rotatable joint, a top housing is slid over the biasing mechanism such that the biasing mechanism abuts a bottom end of the top housing or is located in a cavity defined within the top housing, and the top housing is secured together with the sheath.

In addition to one or more of the features described above, or as an alternative, further embodiments may include that a slider seal housing is secured onto a radially outward surface of an inner casing of the gas turbine engine and a slider seal is inserted into the slider seal housing, the slider seal housing including a slider seal seat configured to fit the slider seal therein. The method may further include that a slider seal cover is secured to the slider seal housing. The slider seal cover being configured to secure the slider seal in the slider seal housing.

In addition to one or more of the features described above, or as an alternative, further embodiments may include that the inner casing further includes an inner port. The slider seal housing further includes a slider seal housing through-passage aligned with the inner port. The slider seal further includes a seal through-passage aligned with the inner port. The slider seal cover further includes a cover through-passage aligned with the inner port. The method further includes that the cover is inserted through the cover through-passage, the seal through-passage, the slider seal housing through-passage, and the inner port of the inner casing.

In addition to one or more of the features described above, or as an alternative, further embodiments may include that the cover is rotated to be about parallel with a radially inward surface of the inner casing.

In addition to one or more of the features described above, or as an alternative, further embodiments may include that the cover further includes a first cover and a second cover.

In addition to one or more of the features described above, or as an alternative, further embodiments may include that the second cover overlaps the first cover by a selected portion after the cover is rotated to be about parallel with a radially inward surface of the inner casing.

In addition to one or more of the features described above, or as an alternative, further embodiments may include that the cover is rotated to be about parallel with the connector body prior to inserting the connector body and the cover operably connected to the connector body into the sheath through-passage of the sheath.

In addition to one or more of the features described above, or as an alternative, further embodiments may include that the cover is rotated to be about parallel with the slider seal after inserting the connector body and the cover operably connected to the connector body into the sheath through-passage of the sheath.

In addition to one or more of the features described above, or as an alternative, further embodiments may include that the cover is operably connected to the connector body.

In addition to one or more of the features described above, or as an alternative, further embodiments may include that the cover further includes a first cover and a second cover. The connector body further includes a first connector body and a second connector body. The rotatable joint further includes a first rotatable joint and a second rotatable joint.

In addition to one or more of the features described above, or as an alternative, further embodiments may include that inserting the connector body and the cover operably connected to the connector body into the sheath through-passage of the sheath further includes that the first connector body and the first cover operably connected to the first connector body are inserted into the sheath through-passage of the sheath and the second connector body and the second cover operably connected to the second connector body are inserted into the sheath through-passage of the sheath.

In addition to one or more of the features described above, or as an alternative, further embodiments may include that the plug assembly is secured to the gas turbine engine.

In addition to one or more of the features described above, or as an alternative, further embodiments may include that the plug assembly is secured to an outer casing of the gas turbine engine.

In addition to one or more of the features described above, or as an alternative, further embodiments may include that securing the plug assembly to the gas turbine engine further includes that a housing through-passage within the top housing is aligned with a threaded hole in the sheath, a fastening mechanism is inserted through the housing through-passage, and the fastening mechanism are rotated such that a threaded portion of the fastening mechanism interlocks with the threaded hole to secure the plug assembly to the gas turbine engine.

In addition to one or more of the features described above, or as an alternative, further embodiments may include that the connector body further includes a lower end, the rotatable joint being located at the lower end, an upper end located opposite the lower end, and a connector body flange located between the lower end and the upper end. The connector body flange dividing the connector body into a lower portion located at or proximate the lower end and an upper portion located at or proximate the upper end.

In addition to one or more of the features described above, or as an alternative, further embodiments may include that installing the biasing mechanism further includes that the biasing mechanism is slide onto the upper portion of the connector body.

In addition to one or more of the features described above, or as an alternative, further embodiments may include that the biasing mechanism is a spring.

According to another embodiment, a plug assembly for plugging one or more ports of a gas turbine engine is provided. The plug assembly includes a sheath including an inner end, an outer end located opposite the inner end, and a sheath through-passage extending from the outer end to the inner end. The plug assembly includes a connector body passing through the sheath through-passage. The connector body including a rotatable joint. The plug assembly includes a cover operably connected to the connector body via the rotatable joint, a biasing mechanism configured to apply a force to the connector body, and a top housing including a bottom end and a connector passageway extending from the bottom end a top end of the top housing. The biasing mechanism abuts the bottom end or is located in the cavity at the bottom end. The connector body passes through the connector passageway.

In addition to one or more of the features described above, or as an alternative, further embodiments may include that the connector body further includes a lower end. The rotatable joint being located at the lower end. The connector body further includes an upper end located opposite the lower end and a connector body flange located between the lower end and the upper end. The connector body flange dividing the connector body into a lower portion located at or proximate the lower end and an upper portion located at or proximate the upper end.

In addition to one or more of the features described above, or as an alternative, further embodiments may include that the biasing mechanism is located on the upper portion of the connector body.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
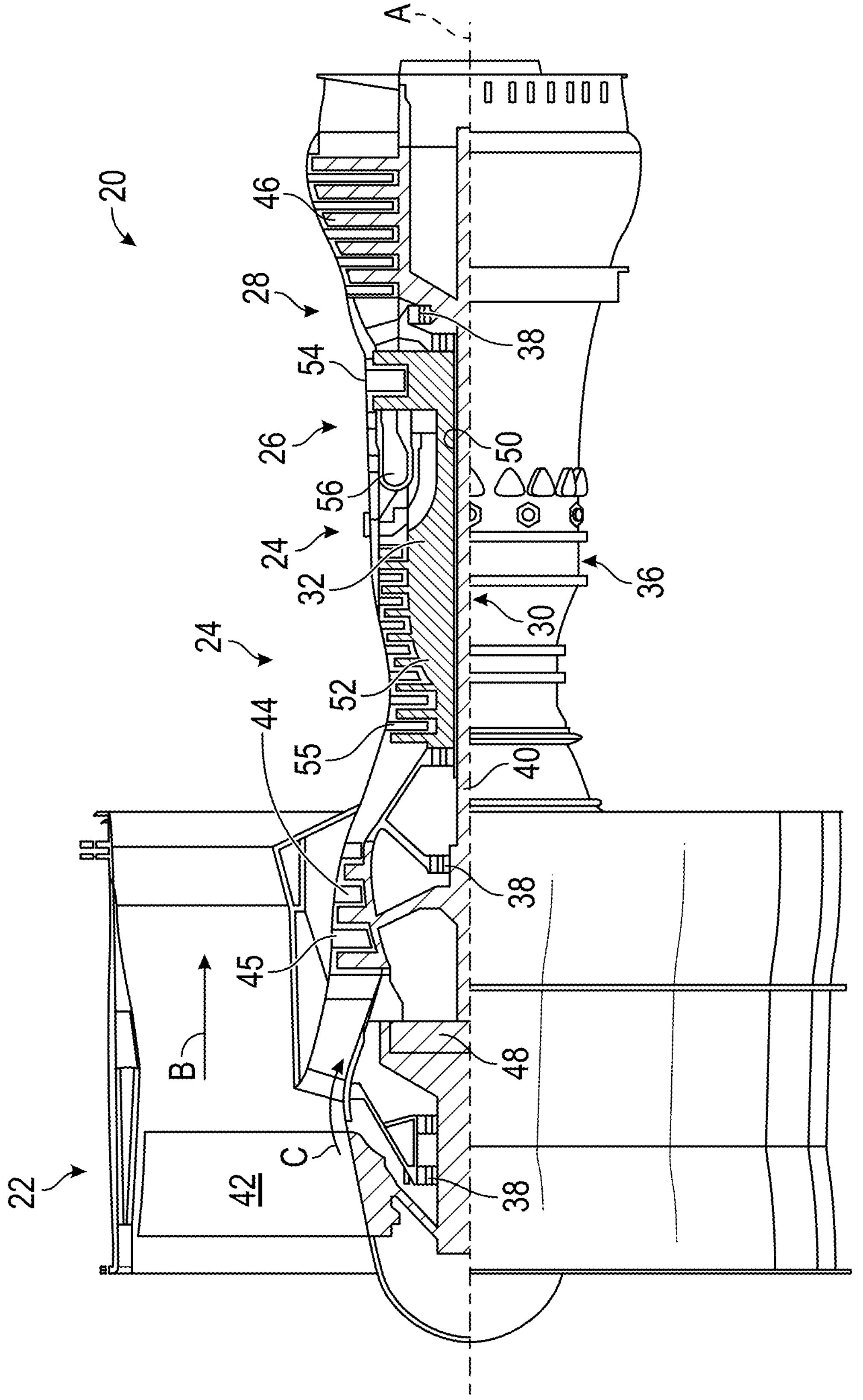
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. In some embodiments, stator vanes 45 in the low pressure compressor 44 and stator vanes 55 in the high pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}\ ^\circ \text{R})/(518.7^\circ \text{R})]^{0.5}$. The "Low corrected fan tip speed" as disclosed herein according to one non-limiting embodiment is less than about 1150 ft/second (350.5 m/sec).

Figure 2:
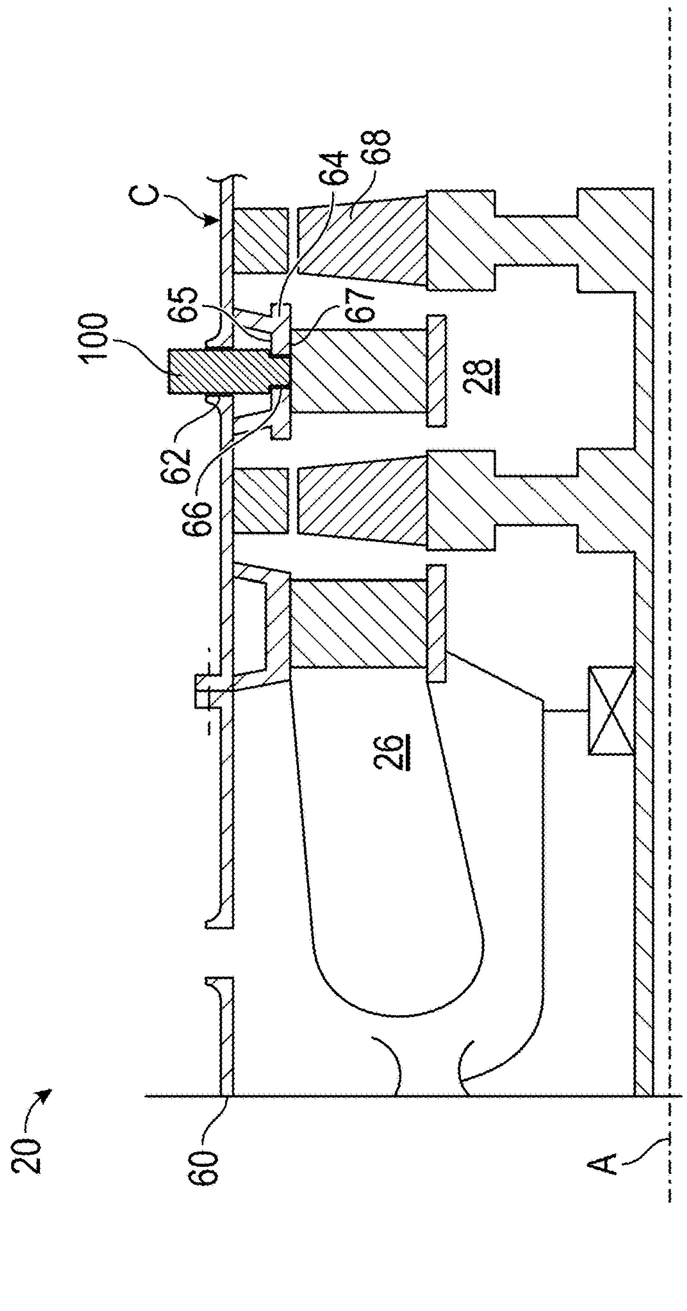
FIG. 2 is a side view graphical representation of a plug assembly located within a gas turbine engine, in accordance with an embodiment of the disclosure.
Figure 3:
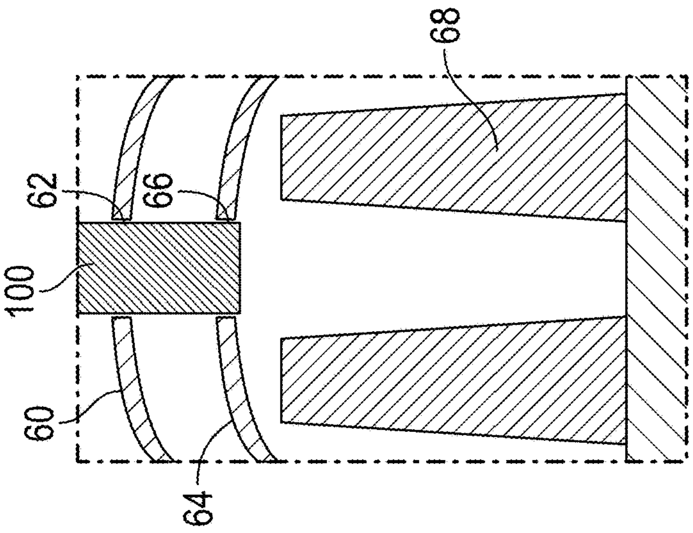
FIG. 3 is an axial view graphical representation of a plug assembly located within a gas turbine engine, in accordance with an embodiment of the disclosure.

Referring now to FIGS. 2 and 3, with continued reference to FIG. 1, a graphical representation of a plug assembly 100 (see also FIGS. 3-10) located within a gas turbine engine 20 is illustrated, in accordance with an embodiment of the present disclosure.

The plug assembly 100 may be a borescope plug assembly and inspection port assembly. The plug assembly 100 are shown within an outer port 62 located within an outer casing 60 of the gas turbine engine 20 and an inner port 66 located in an inner casing 64 of the gas turbine engine 20. The port 62 may be a borescope port or an inspection port. In an embodiment, the outer casing 60 may be a high pressure turbine case. The outer casing 60 may also be a lower pressure turbine case, a diffuser case, a high pressure compressor case, or any other case that requires an in section port in the gas turbine engine 20.

The plug assembly 100 extend radially inward toward the engine central longitudinal axis A of the gas turbine engine 20. As illustrated in FIG. 2, the plug assembly 100 may extend from the inner port 66 to the outer port 62. The inner casing 64 is located radially inward from the outer casing 60. The inner casing 64 may be a mid-turbine frame (MTF) vane casing. It is understood that the inner casing 64 is not limited to the MTF vane casing and the embodiment described herein are applicable to the inner casing 64 being any other casing or component located within the gas turbine engine 20 that is radially inward from the outer casing 60. The inner casing 64 includes a radially inward surface 67 and a radially outward surface 65 located opposite the radially inward surface 67. The radially outward surface 65 is located radially outward of the radially inward surface 67. The inner port 66 extends from the radially inward surface 67 to the radially outward surface 65.

In an embodiment, the inner port 66 and the outer port 62 may be located in the turbine section 28 of the gas turbine engine 20. It is understood that the embodiments disclosed herein are not limited to the inner port 66 and the outer port 62 being located in the turbine section 28 of the gas turbine engine 20, and therefore the inner port 66 and the outer port 62 may be located in other sections of the gas turbine engine. The turbine section 28 is located aft of the combustor section 26. The turbine section 28 includes a plurality of vanes 68 extending circumferentially around the engine central longitudinal axis A. The inner port 66 and the outer port 62 may be located interposed circumferentially between two adjacent vanes 68, as illustrated in FIG. 3.

Removal of at least a portion or an entirety of the plug assembly 100 from the outer port 62 and the inner port 66 may allow inspection into the outer port 62 and inner port 66. As such, the plug assembly 100 provides access to the gas turbine engine 20 radially inward of the outer port 62 and/or the inner port 66 for mechanical diagnostics or other diagnostic reasons.

Figure 4:
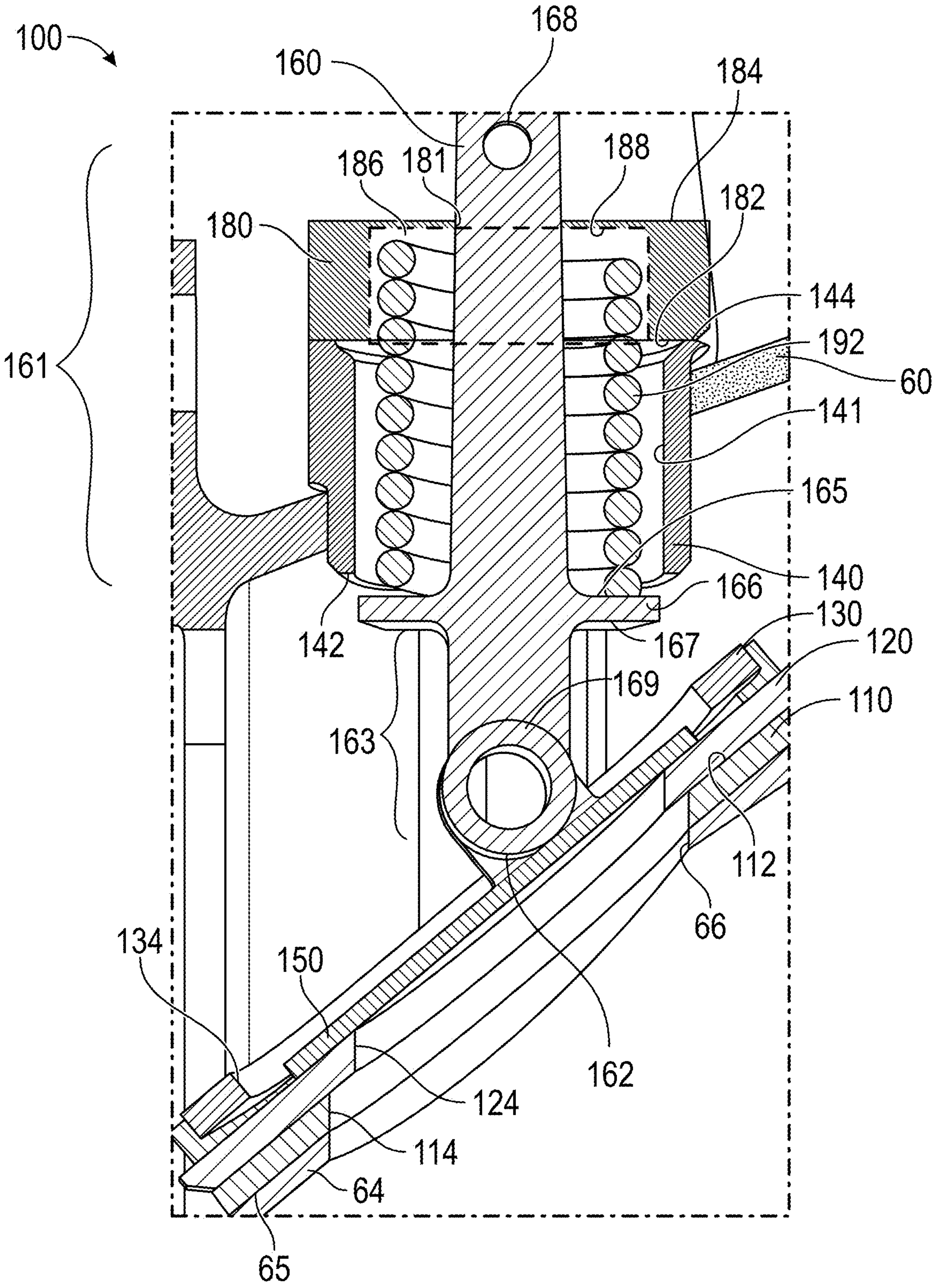
FIG. 4 is a cross-sectional view of a plug assembly, in accordance with an embodiment of the disclosure.
Figure 5:
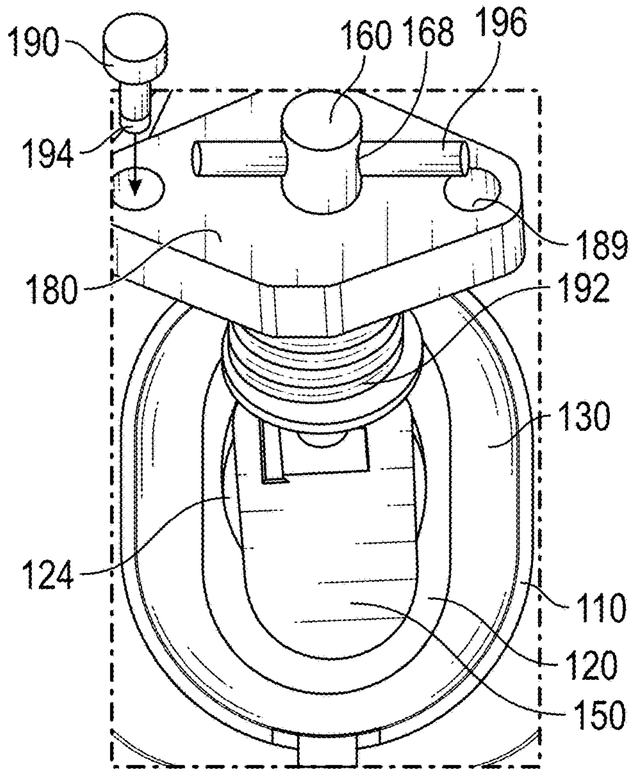
FIG. 5 is a perspective view of a plug assembly, in accordance with an embodiment of the disclosure.

Referring now to FIGS. 4 and 5, with continued reference to FIGS. 1-3, a cross-sectional view of a plug assembly 100 is illustrated, in accordance with an embodiment of the present disclosure.

The plug assembly 100 may be configured to secure an outer casing 60 in place, a slider seal housing 110 in place, a slider seal 120 in place, a slider seal cover 130 in place, or any other component of the gas turbine engine 20 in place. Further it is understood that while the plug assembly 100 has been described herein as securing the slider seal cover 130 in place, the plug assembly 100 may secure any component of the gas turbine engine 20 in place.

The plug assembly 100 of FIGS. 4 and 5 may include the slider seal housing 110, the slider seal 120, the slider seal cover 130, a sheath 140, a cover 150, a connector body 160, a top housing 180, one or more fastening mechanism 190, and a biasing mechanism 192.

The slider seal housing 110 abuts the radially outward surface 65 of the inner casing 64. The slider seal housing 110 may be secured to the radially outward surface 65 of the inner casing 64. The slider seal housing 110 may be secured to the radially outward surface 65 of the inner casing 64 via a weld or any other attachment method know to one of skill in the art. The slider seal housing 110 includes a slider seal seat 112 configured to fit the slider seal 120 therein. The slider seal 120 is configured to fit within the slider seal seat 112. The slider seal 120 is secured within the slider seal seat 112 by a slider seal cover 130. The slider seal cover 130 is secured to the slider seal housing 110. The slider seal cover 130 may be secured to the slider seal housing 110 via a weld or any other attachment method know to one of skill in the art. The slider seal cover 130 is configured to maintain or entrap the slider seal 120 within the slider seal housing 110 such that the slider seal 120 is free to slide between the slider seal cover 120 and slider seal housing 110 and is not fixed in place. The slider seal cover 130 may be configured to allow the slider seal 120 to move freely relative to the slider seal cover 130 and the slider seal housing 110.

The slider seal housing 110 may be circular in shape with a slider seal housing through-passage 114. The slider seal 120 may be circular in shape with a seal through-passage 124. The slider seal cover 130 may be circular in shape with a cover through-passage 134. The connector body 160 is configured to pass through the sheath 140 with the cover 150 and the cover 150 is configured to cover the inner port 66. The cover 150 may be configured too completely cover the inner port 66 or partially cover the inner port 66. The cover 150 may compress against the slider seal 120. The cover 150 may be configured too partially cover the seal through-passage 124 to plug the inner port 66.

The sheath 140 includes an inner end 142 and outer end 144 located radially outward from the inner end 142 when the plug assembly 100 is installed in the gas turbine engine 20. A sheath through-passage 141 extends through the sheath 140 from the inner end 142 to the outer end 144.

The top housing 180 includes a top end 184 and a bottom end 182 located opposite the top end 184. The bottom end 182 of the top housing 180 abuts the outer end 144 of the sheath 140. The top housing 180 may include a cavity 186 extending from the bottom end 182 of the top housing 180 into the top housing 180 to a base 188. The cavity 186 is a blind hole as it does not pass completely through the top housing 180. Alternatively, no cavity 186 may be present in the top housing 180 the biasing mechanism 192 illustrated may abut the bottom end 182 of the top housing 180. The top housing 180 includes a connector passageway 181 that extends from the top end 184 to bottom end 182 or the base 188 if the cavity 186 is present. The top housing 180 is slid over the upper end 164 of the connector body 160 by sliding the upper end 164 of the connector body 160 through the connector passageway 181. The upper end 164 of the connector body 160 is slid through the connector passageway 181 and the upper end 164 projects out of the connector passageway 181 past the top end 184 of the top housing 180, such that a locking pin through-passage 168 is fully accessible by a locking pin 196.

The cavity 186, if present, may be configured to align with the sheath through-passage 141. A portion of the connector body 160 is located within the combined cavity defined by the cavity 186 and the sheath through-passage 141. Thus, the connector body 160 extends across the cavity 186 and the sheath through-passage 141.

The connector body 160 includes a lower end 162 and an upper end 164 located opposite the lower end 162. The connector body 160 includes a rotatable joint 169 at the lower end 162. The cover 150 is operably connected to the connector body 160 at the rotatable joint 169. The cover 150 is configured to rotate relative to the connector body 160 at the rotatable joint 169. The cover 150 may be rotated to be substantially parallel or roughly parallel (i.e., about parallel) with the connector body 160 in order to fit through the sheath through-passage 141 during installation and then the cover 150 may be rotated to be substantially parallel or roughly parallel with the slider seal 120. The plug assembly 100 is configured to press the cover 150 into the slider seal 120 using a biasing mechanism 192 in order to seal the inner port 66. The length of the cover 150 is larger than the diameter of the sheath through-passage 141.

The connector body 160 includes a connector body flange 166 located between the upper end 164 and the lower end 162. The connector body flange 166 includes an upper surface 165 and a lower surface 167 located opposite the upper surface 165.

The connector body flange 166 divides or separates the connector body flange 166 into an upper portion 161 and a lower portion 163. The upper portion 161 is located at or proximate the upper end 164 and the lower portion 163 is located at or proximate the lower end 162.

If the cavity 186 is present, the biasing mechanism 192 may be interposed between the base 188 of the cavity 186 and the upper surface 165 of the connector body flange 166. If the cavity 186 is not present, the biasing mechanism 192 may be interposed between the bottom end 182 of the top housing 180 and the upper surface 165 of the connector body flange 166. In an embodiment, the biasing mechanism 192 may be a spring. The biasing mechanism 192 applies a force against the base 188 or the bottom end 182 and the upper surface 165 and pushes the upper surface 165 and the connector body 160 radially inward towards the inner port 66, which applies a radially inward force to the cover 150 and the cover 150 then applies a force to the slider seal 120.

The connector body 160 includes a locking pin through-passage 168 located proximate the upper end 164. The locking pin through-passage 168 is configured to fit a locking pin 196 therein. The locking pin 196 may be configured to lock the connector body 160 in place relative to the top housing 180.

The plug assembly 100 further includes one or more fastening mechanisms 190 configured to secure the plug assembly 100 to the outer casing 60. The one or more fastening mechanisms 190 passes through the top housing 180 to secure the plug assembly 100 to the outer casing 60. In an embodiment, the fastening mechanism 190 may be a bolt. The fastening mechanism 190 may have a threaded portion 194. The fastening mechanism 190 passes through a housing through-passage 189 in the top housing 180 to secure within a threaded hole (not shown) located in the sheath 140. The threaded portion 194 is configured to interlock with the threaded hole (not shown) when the fastening mechanism 190 is rotated.

Figure 6:
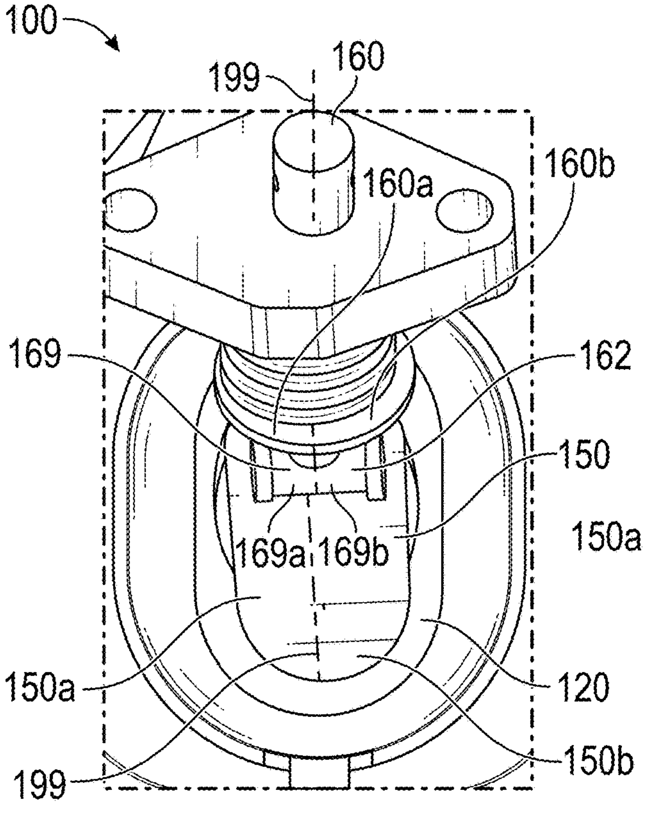
FIG. 6 is a perspective view of a plug assembly, in accordance with an embodiment of the disclosure.
Figure 7:
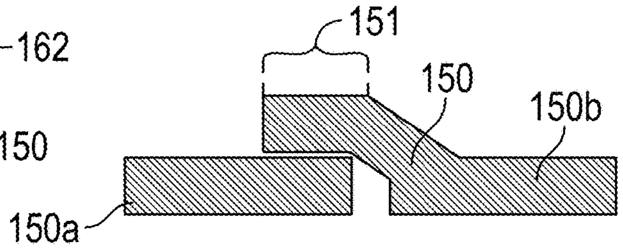
FIG. 7 is a side view of a cover, in accordance with an embodiment of the disclosure.

Referring now to FIGS. 6 and 7, with continued reference to FIGS. 1-5, an alternate embodiment of a separating mechanism for use in the plug assembly 100 is illustrated, in accordance with an embodiment of the present disclosure.

The plug assembly 100 of FIG. 6 uses a connector body 160 that is composed of a first connector body **160*a* and a second connector body 160*b*. The connector body 160 is divided into the first connector body 160*a* and a second connector body 160*b* along a seam 199 that stretches from the lower end 162 to the upper end 164. In other words, the first connector body 160*a* extends from the upper end 164 to the lower end 162 and the second connector body 160*b* extends from the upper end 164 to the lower end 162**.

The plug assembly 100 of FIG. 6 uses a cover 150 that is composed of a first cover **150*a* and a second cover 150*b*. The plug assembly 100 of FIG. 6 uses a rotatable joint 169 that is composed of a first rotatable joint 169*a* and a second rotatable joint 169*b*. The first connector body 160*a* includes the first rotatable joint 169*a* located at the lower end 162 and the second connector body 160*b* the second rotatable joint 169*b* located at the lower end 162. The first cover 150*a* may be operably or rotatably connected to first connector body 160*a* at the first rotatable joint 169*a*. The second cover 150*b* may be operably or rotatably connected to the second connector body 160*b* at the second rotatable joint 169*b***.

The first cover 150_a_ may be rotated to be substantially parallel or roughly parallel with the first connector body 160_a_ in order to fit through the sheath through-passage 141 during installation and then the first cover 150_a_ may be rotated to be substantially parallel or roughly parallel with the slider seal 120. The plug assembly 100 is configured to press the first cover 150_a_ into the slider seal 120 using a biasing mechanism 192 in order to seal the inner port 66.

The second cover 150_b_ may be rotated to be substantially parallel or roughly parallel with the second connector body 160_b_ in order to fit through the sheath through-passage 141 during installation and then the second cover 150_b_ may be rotated to be substantially parallel or roughly parallel with the slider seal 120. The plug assembly 100 is configured to press the second cover 150_b_ into the slider seal 120 using a biasing mechanism 192 in order to seal the inner port 66.

As illustrated in FIG. 7, the second cover 150_b_ may overlap the first cover 150_a_ by a selected portion 151 in order to achieve a better seal between the first cover 150_a_ and the second cover 150_b_, such that air leakage between the first cover 150_a_ and the second cover 150_b_ is reduced or eliminated. Alternatively, the first cover 150_a_ may overlap the second cover 150_b_ by a selected portion 151 in order to achieve a better seal between the first cover 150_a_ and the second cover 150_b_, such that air leakage between the first cover 150_a_ and the second cover 150_b_ is reduced or eliminated. Alternatively, the first cover 150_a_ may abut the second cover 150_b_.

Figure 8:
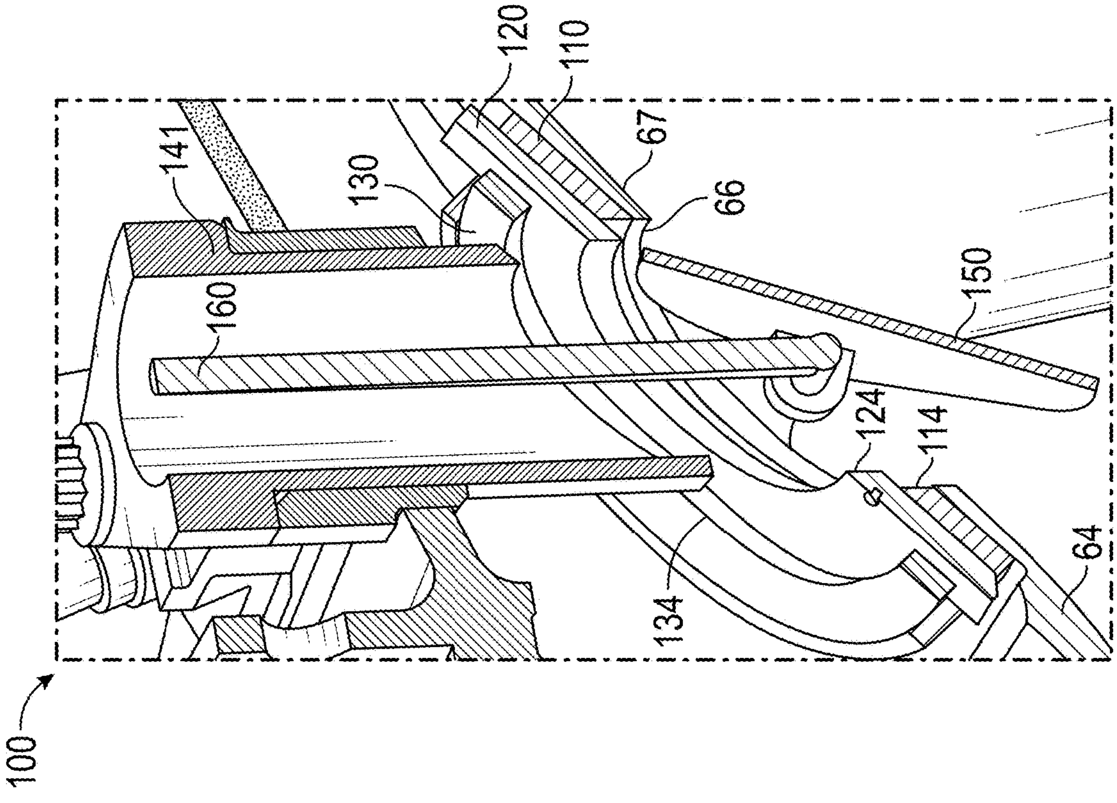
FIG. 8 is a perspective cut-away view of a plug assembly, in accordance with an embodiment of the disclosure.
Figure 9:
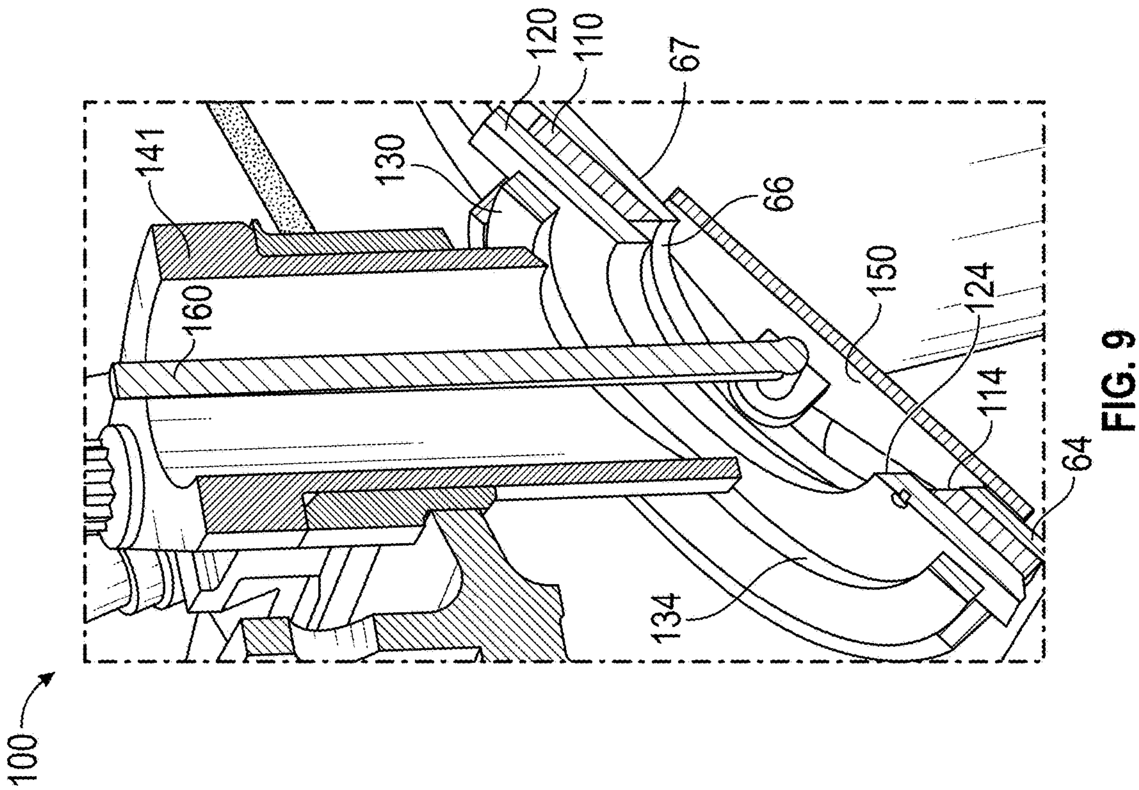
FIG. 9 is a perspective cut-away view of a plug assembly, in accordance with an embodiment of the disclosure.

Referring now to FIGS. 8 and 9, with continued reference to FIGS. 1-7, an alternate embodiment of a cover 150 for use in the plug assembly 100 is illustrated, in accordance with an embodiment of the present disclosure. The plug assembly 100 of FIGS. 7 and 8 seals the inner port 66 by compressing the cover 150 into the radially inward surface 67 of the inner casing 64.

The cover 150 may be rotated to be substantially parallel or roughly parallel with the connector body 160 in order to fit through the sheath through-passage 141, the cover through-passage 134 of the slider seal cover 130, the seal through-passage 124 of the slider seal 120, the slider seal housing through-passage 114 of the slider seal housing 110, and the inner port 66 during installation, then the cover 150 may be rotated to be substantially parallel or roughly parallel with the radially inward surface 67 of the inner casing 64. The plug assembly 100 is configured to pull the cover 150 radially outward into the radially inward surface 67 using a tension mechanism (not shown) or a pressure differential between the gas turbine engine 20 radially inward of the inner casing 64 and the gas turbine engine 20 radially outward of the inner casing 64. The locking pin 196 of a mechanism similar to the locking pin 196 may be used to prevent the cover 150 and the connector body 160 from falling radially inward into the gas turbine engine 20.

In an embodiment, the cover 150 of FIG. 8 and FIG. 9, may be composed of a first cover 150_a_ and a second cover 150_b_ as described previously in relations to FIG. 6. In an embodiment, the connector body 160 of FIG. 8 and FIG. 9, may be composed of a first connector body 160_a_ and a second connector body 160_b_ as described previously in relations to FIG. 6. In an embodiment, the rotatable joint 169 of FIG. 8 and FIG. 9, may be composed of a first rotatable joint 169_a_ and a second rotatable joint 169_b_ as described previously in relations to FIG. 6.

Figure 10A:
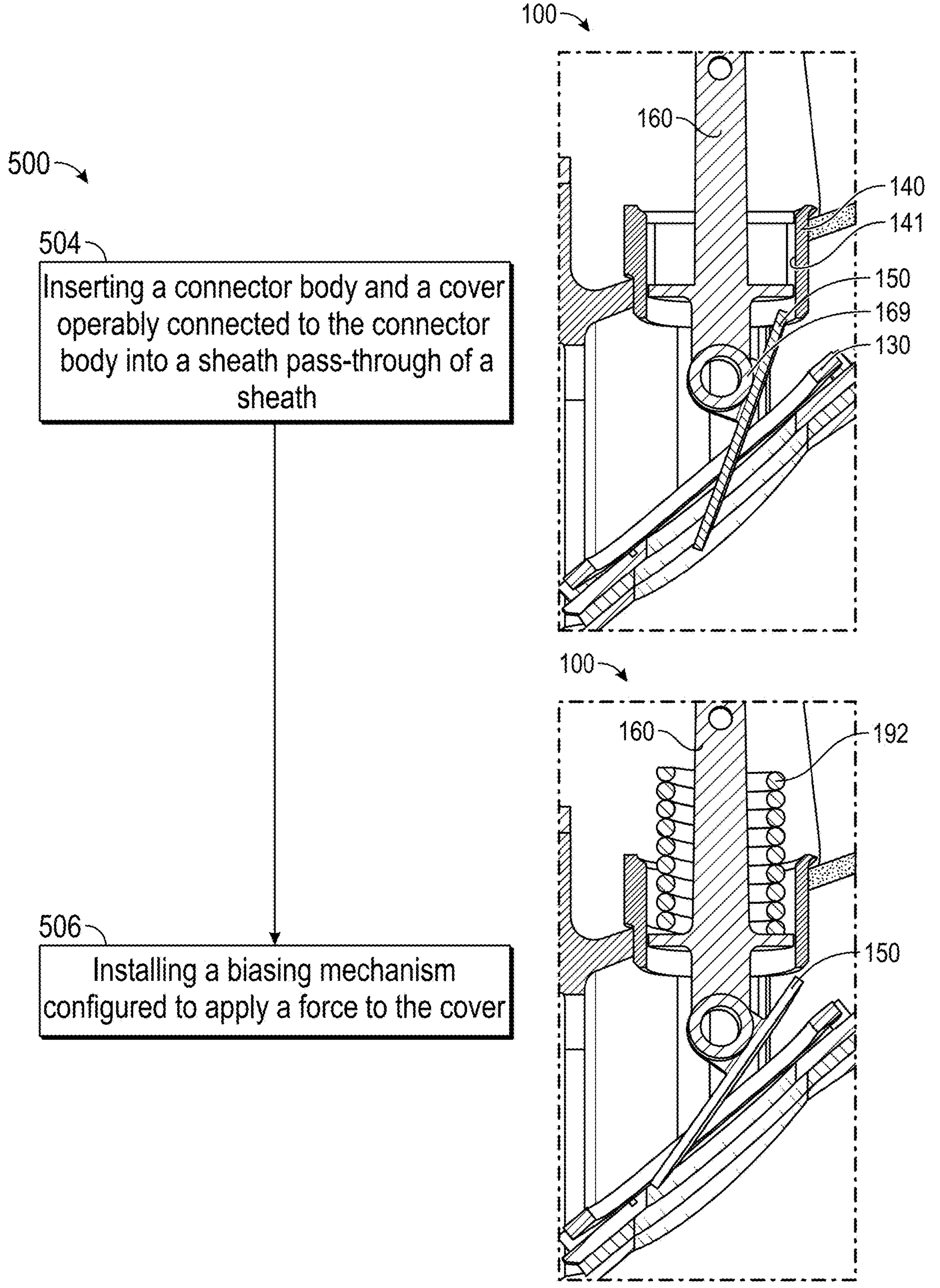
FIGS. 10A, 10B, and 10C is a flow chart illustrating a method of assembling the plug assembly for plugging one or more ports of a gas turbine engine, in accordance with an embodiment of the disclosure.
Figure 10B:
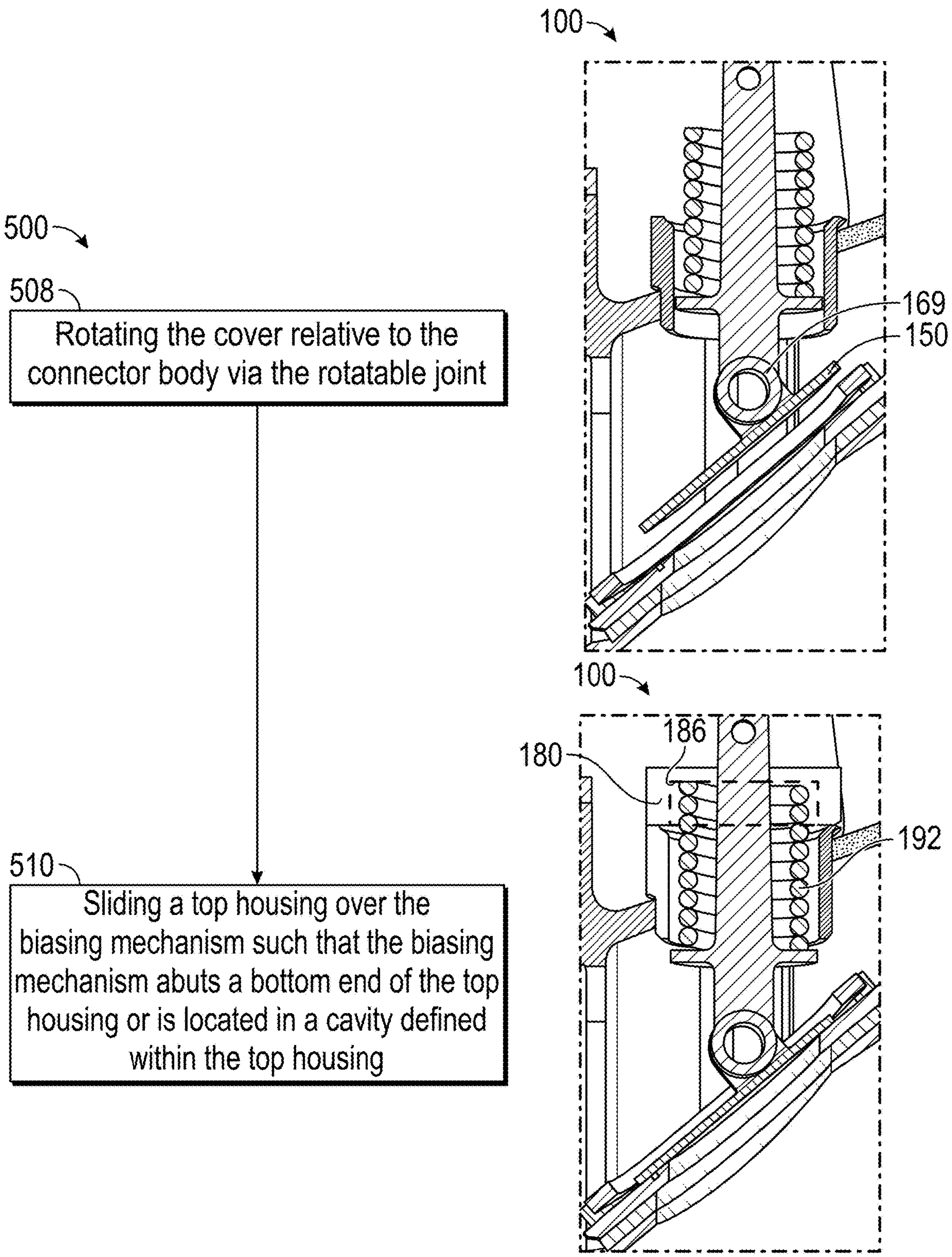
Figure 10C:
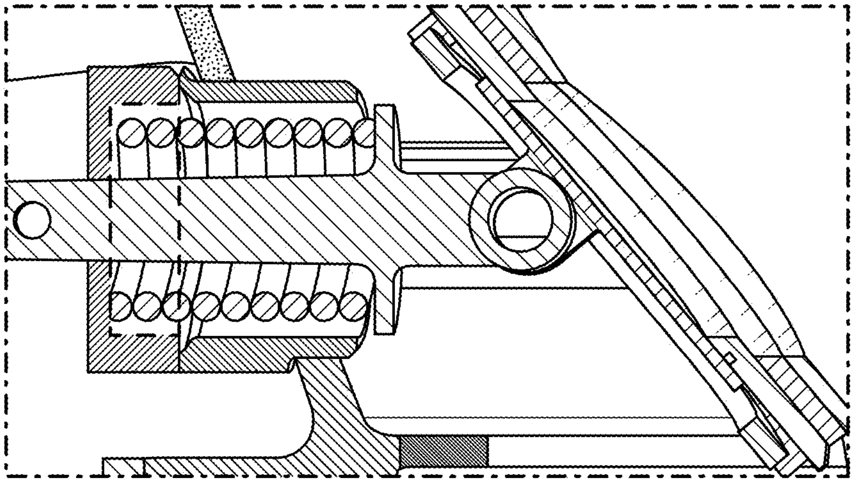

Referring now to FIGS. 10A, 10B, and 10C, with continued reference to FIGS. 1-9, a flow chart of a method 500 of assembling the plug assembly 100 for plugging one or more ports 66, 62 of a gas turbine engine 20 is illustrated, in accordance with an embodiment of the present disclosure.

It is understood that while the method 500 is being illustrated and described largely with the embodiments of FIGS. 4 and 5, the method 500 is not limited to the embodiments illustrated in FIGS. 4-5 and may also be applicable to the embodiments illustrated in FIGS. 6-9.

At block 504, a connector body 160 and a cover 150 operably connected to the connector body 160 are inserted into a sheath through-passage 141 of a sheath 140. The connector body 160 including a rotatable joint 169 located operably connecting the cover 150 to the connector body 160. Prior to block 504, the method 500 may also include operably connecting the cover 150 to the connector body 160. Prior to block 504, the method 500 may additionally include that the cover 150 is rotated to be about parallel with the connector body 160 prior to inserting the connector body 160 and the cover 150 into the sheath through-passage 141 of the sheath 140. This may be necessary to fit the cover 150 and the connector body 160 through the sheath through-passage 141 of a sheath 140.

As aforementioned, the cover 150 may further include a first cover 150_a_ and a second cover 150_b_. The connector body 160 may further include a first connector body 160_a_ and a second connector body 160_b_, and the rotatable joint 129 may further include a first rotatable joint 129_a_ and a second rotatable joint 129_b_. If the cover 150 includes a first cover 150_a_ and a second cover 150_b_ then the method 500 may include that a first connector body 160_a_ and the first cover 150_a_ operably connected to the first connector body 160_a_ is inserted into the sheath through-passage 141 of the sheath 140 and a second connector body 160_b_ and the second cover 150_b_ operably connected to the second connector body 160_b_ is inserted into the sheath through-passage 141 of the sheath 140. The first cover 150_a_ and a second cover 150_b_ may be fit together at a seam 99 to create a single cover 150. The second cover 150_b_ may overlap the first cover 150_a_ by a selected portion 151 when fit together.

At block 506, a biasing mechanism 192 configured to apply a force to the cover 150 is installed. The biasing mechanism 192 may apply the force to the cover 150 through the connector body 160. Block 506 may further include that the biasing mechanism 192 is slid onto the upper portion 161 of the connector body 160. In an embodiment, the biasing mechanism 192 may be a spring.

At block 508, the cover 150 is rotated relative to the connector body 160 via the rotatable joint 129. The cover 150 may be rotated to be about parallel with the slider seal 120. Block 508 may occur before or after block 510 and/or block 512.

At block 510, a top housing 180 is slid over the biasing mechanism 192 such that the biasing mechanism 192 abuts a bottom end 182 of the top housing 180 or is located in a cavity 186 defined within the top housing 180.

At block 512, the top housing 180 is secured together with the sheath 140. The top housing 180 may be secured together with the sheath 140 using one or more fastening mechanism 190.

The method 500 may also include that a slider seal housing 110 is secured onto a radially outward surface 65 of an inner casing 64 of the gas turbine engine 20 and a slider seal 120 is inserted into the slider seal housing 110. The slider seal housing 110 including a slider seal seat 112 configured to fit the slider seal 120 therein. The method 500 may also include that a slider seal cover 130 is secured to the slider seal housing 110. The slider seal cover 130 being configured to secure the slider seal 120 in the slider seal housing 110 such that the slider seal 120 may be free to move.

The method 500 may further include that the cover 150 is inserted through the cover through-passage 134, the seal through-passage 124, the slider seal housing through-passage 114, and the inner port 66 of the inner casing 64. The method 500 may also include the cover 150 is rotated to be about parallel with a radially inward surface 67 of the inner casing 64 after the cover 150 passes through the cover through-passage 134, the seal through-passage 124, the slider seal housing through-passage 114, and the inner port 66 of the inner casing 64. As aforementioned, the cover 150 may further comprises a first cover 150*a* and a second cover 150*b*. The second cover 150*b* may overlap the first cover 150*a* by a selected portion 151 after the cover 150 is rotated to be about parallel with a radially inward surface 67 of the inner casing 64.

The method 500 may include securing the plug assembly 100 to the gas turbine engine 20. The plug assembly 100 may be secured to an outer casing 60 of the gas turbine engine 20. The plug assembly 100 may be secured to an outer casing 60 of the gas turbine engine 20 by securing the sheath 140 to the outer casing 60. The plug assembly 100 may be secured to the gas turbine engine 20 by aligning a housing through-passage 189 within the top housing 180 with a threaded hole in the sheath 140, inserting a fastening mechanism 190 through the housing through-passage 189, and rotating the fastening mechanism 190 such that a threaded portion 194 of the fastening mechanism 190 interlocks with the threaded hole to secure the plug assembly 100 to the gas turbine engine 20.

While the above description has described the flow process of FIGS. 10A,10B, and 10C in a particular order, it should be appreciated that unless otherwise specifically required in the attached claims that the ordering of the steps may be varied.

As used herein radially outward is intended to be in the direction away from the engine central longitudinal axis A and radially outward is intended to be in the direction towards the engine central longitudinal axis A.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A plug assembly for plugging one or more ports of a gas turbine engine, the plug assembly comprising:
- a sheath comprising:
  - an inner end;
  - an outer end located opposite the inner end; and
  - a sheath through-passage extending from the outer end to the inner end;
  - a connector body passing through the sheath through-passage, the connector body comprising a rotatable joint;
  - a cover operably connected to the connector body via the rotatable joint;
  - a biasing mechanism configured to apply a force to the connector body; and
  - a top housing that is slid over the biasing mechanism such than an upper end of the connector body projects past a top end of the top housing, the top housing also comprising a bottom end and a connector passageway extending from the bottom end to the top end of the top housing, wherein the biasing mechanism abuts the bottom end or is located in a cavity at the bottom end, and wherein the connector body passes through the connector passageway; and
- a locking pin inserted into a locking pin through-passage in the upper end of the connector body.

2. The plug assembly of claim 1, wherein the connector body further comprises:
- a lower end, the rotatable joint being located at the lower end;
- an upper end located opposite the lower end;
- a connector body flange located between the lower end and the upper end, the connector body flange dividing the connector body into:
  - a lower portion located at or proximate the lower end; and
  - an upper portion located at or proximate the upper end.

3. The plug assembly of claim 2, wherein the biasing mechanism is located on the upper portion of the connector body.

4. The plug assembly of claim 1, further comprising:
- a slider seal housing secured onto a radially outward surface of an inner casing of the gas turbine engine;
- a slider seal inserted into the slider seal housing, the slider seal housing including a slider seal seat configured to fit the slider seal therein; and
- a slider seal cover secured to the slider seal housing, the slider seal cover being configured to secure the slider seal in the slider seal housing.

5. The plug assembly of claim 4, wherein the inner casing further comprises an inner port,
- wherein the slider seal housing further comprises a slider seal housing through-passage aligned with the inner port,
- wherein the slider seal further comprises a seal through-passage aligned with the inner port, and
- wherein the slider seal cover further comprises a cover through-passage aligned with the inner port.

6. The plug assembly of claim 1, wherein the cover further comprises a first cover and a second cover.

7. The plug assembly of claim 6, wherein the second cover overlaps the first cover by a selected portion after the first cover is rotated to be about parallel with a radially inward surface of an inner casing of the gas turbine engine.

8. The plug assembly of claim 1, wherein the cover further comprises a first cover and a second cover, the connector body further comprises a first connector body and a second connector body, and the rotatable joint further comprises a first rotatable joint and a second rotatable joint.

9. The plug assembly of claim 8, wherein the plug assembly is secured to an outer casing of the gas turbine engine.

10. The plug assembly of claim 1, wherein the biasing mechanism is a spring.

* * * * *